United States Patent [19]

Guy

[11] Patent Number: 5,007,659
[45] Date of Patent: Apr. 16, 1991

[54] INTERNAL DAMPING FORCE SENSOR

[75] Inventor: Yoram Guy, Ann Arbor, Mich.

[73] Assignee: Monroe Auto Equipment Company, Monroe, Mich.

[21] Appl. No.: 489,920

[22] Filed: Mar. 7, 1990

[51] Int. Cl.⁵ .............................................. B60G 11/26
[52] U.S. Cl. .................................................... 280/707
[58] Field of Search ........................................ 280/707

[56] References Cited

U.S. PATENT DOCUMENTS

| | | | |
|---|---|---|---|
| 3,124,368 | 3/1965 | Corley | 280/707 |
| 3,807,678 | 4/1974 | Karnopp | 267/126 |
| 3,995,883 | 12/1976 | Glaze | 280/707 |
| 4,065,154 | 12/1977 | Glaze | 280/707 |
| 4,333,668 | 6/1982 | Hendrickson | 280/703 |
| 4,468,050 | 8/1984 | Woods | 280/707 |
| 4,469,315 | 9/1984 | Nicholls | 267/64.17 |
| 4,598,929 | 7/1986 | Kumagai | 280/707 |
| 4,600,215 | 7/1986 | Kuroki | 280/707 |
| 4,648,622 | 3/1987 | Wada | 280/707 |
| 4,682,675 | 7/1987 | Eddy, Jr. | 280/707 |
| 4,732,408 | 3/1988 | Ohlin | 280/707 |
| 4,741,554 | 5/1988 | Okamoto | 280/703 |
| 4,743,046 | 5/1988 | Schnittger | 280/707 |
| 4,776,437 | 10/1988 | Ishibashi et al. | 280/707 |
| 4,788,489 | 11/1988 | Kobayaski | 324/61 P |

FOREIGN PATENT DOCUMENTS

0186908A2 9/1986 European Pat. Off. .
WO87/00615 3/1987 World Int. Prop. O. ........... 280/707

OTHER PUBLICATIONS

U.S. patent application Ser. No. 154,343, 1/13/88, Lizell.
U.S. patent application Ser. No. 331,668, 12/09/88, Lizell.
U.S. patent application Ser. No. 322,543, 3/13/89, Groves et al.
U.S. patent application Ser. No. 322,774, 3/13/89, Athanas et al.

Primary Examiner—Kenneth R. Rice
Attorney, Agent, or Firm—Harness, Dickey & Pierce

[57] ABSTRACT

In a remote controlled fluid piston-piston rod type damper, a ported damping piston divides a cylinder into upper and lower chambers, a "spoiler" sleeve reciprocably encircles an electrical coil, a pair of shoulders extend radially from the piston rod, and a pair of precompressed coil springs position the piston between the shoulders for reciprocable axial movement relative to the piston rod. An electrically controlled valve operates to regulate flow between the chambers in response to relative reciprocable motion between the piston rod and the piston, the electrical coil being energized by an alternating voltage input whereby to generate a magnetic field about the sleeve. Movement of the spoiler sleeve through the magnetic field changes the current in the electrical due to self-inductance, and a remote control module generates a control signal, in response to the change in coil current, to actuate the electrically controlled valve whereby to regulate flow between the chambers.

33 Claims, 4 Drawing Sheets

INITIAL POSITION

FIG. 1.

INITIAL POSITION

FIG. 4.
REBOUND

INTERNAL DAMPING FORCE SENSOR

BACKGROUND AND SUMMARY OF THE INVENTION

This invention relates to piston-type fluid suspension systems of the type comprising a pressure cylinder adapted to receive a ported piston which is slidably disposed at one end of a reciprocable piston rod and divides the cylinder interior into two chambers, and more particularly to an improved hydraulic damper provided with an internal damping force sensor for adjusting damping characteristics of the damper both during compression and rebound strokes of the piston rod.

Whenever an automotive vehicle is in motion, springs in the vehicle suspension system compress and extend whereby to absorb road and maneuver inputs. However, unless damped or subjected to friction, the sprung and unsprung masses of the vehicle will continue to vibrate and such vibration will act to reduce the road-holding ability and riding comfort of the vehicle. To obtain better riding comfort and dampen unwanted vibrations, a hydraulic damper is connected between the body and the suspension of the vehicle. For the hydraulic damper to accommodate both compression and rebound of the piston rod, the hydraulic fluid must be allowed to pass between the two chambers, such as through the piston rod, or through a second cylinder encircling the first cylinder and defining a reserve chamber, and/or through the piston.

A ported piston limits the flow of damping fluid between the chambers when the piston rod is extended or compressed whereby to "smooth" or "dampen" vibrations transmitted from the suspension to the body. Generally, the greater the degree to which the flow of damping fluid is restricted by the piston, the greater the damping forces which are provided by the damper. A soft compression and rebound stroke is produced when the flow of damping fluid is relatively unrestricted. Conversely, a firm compression and rebound stroke is produced when there is an increased restriction in the flow of fluid in the damping chamber. Generally, the damping force is increased during extension for road-holding ability and decreased during compression for improvement in riding comfort.

Because different driving characteristics depend on the amount of damping forces the hydraulic damper provides, it would be desirable to have an arrangement in which the amount of damping force generated by the damper is adjustable and remotely controllable. In U.S. Pat. No. 4,313,529, issued Feb. 2, 1982 to Kato et al., an electromagnetically operated valve allows fluid to pass through the piston rod and between the chambers. In U.S. Patent Application Ser. No. 322,774, filed Mar. 19, 1989, an electromagnetically controlled solenoid opens an additional fluid path in the piston assembly. These references show that both a monotube (e.g., Kato et al.), or concentric multi-tube cylinders (e.g., the Patent Application) are suitable. The disclosure of each noted reference is specifically incorporated herein by reference.

An object of this invention is provision of means to detect instantaneous damping forces across a piston.

Another object of this invention is provision of a suspension system of the type described wherein apparatus is provided for controlling the amount of damping fluid flowing between the upper and lower portions of the working chamber to adjust the damping characteristic of the suspension system.

Yet another object of the present invention is provision of apparatus for controlling a hydraulic damper in which displacement of the piston assembly relative to the piston rod determines the occurrence of a compression or rebound stroke and allows a control means to adjust the pressure differential between the upper and lower portions of the working chamber (i.e., the pressure difference across the piston).

To achieve the above and other objects, there is provided a hydraulic damper of the type including a cylinder having an interior cavity to store damping fluid, a piston rod guide adjacent to one end of the cavity, a piston rod sealably and reciprocably inserted into one end of the cylinder and extending through the guide unit, and a piston unit connected to the piston rod and dividing the cavity into a compression chamber and a rebound chamber. A damping force generating mechanism is provided in the form of passageways which extend through the piston unit and/or through the piston rod and which operate to restrictively pass fluid between the compression and rebound chambers.

In accordance with this invention, the piston rod includes a generally hollow portion, an electrical coil is wound coaxially around the piston rod, the piston unit is slidably disposed about the piston rod for reciprocable axial movement between a pair of axially spaced shoulders, and a pair of precompressed helical coil springs position the piston unit between the shoulders and resist movement of the piston unit relative to the piston rod. The piston unit is provided with a pair of axial passages and associated valve plates which restrictively allow (or inhibit) fluid to flow between the chambers, and a cylindrical "target" or "spoiler" sleeve extending in encircling relation about the piston rod. An electrically controllable valve is operably connected to the inner end of the piston rod for regulating flow of fluid through the piston rod and between the chambers in response to an electrical control signal.

An oscillator external to the damper imposes an alternating electrical voltage on the electrical coil, resulting in an alternating electrical current to energize the coil which in turn generates a magnetic field about the spoiler sleeve. A current sensor and electronic control module, remote to the piston assembly, detects relative movement of the sleeve relative to the magnetic field, which is reflected in a change in the electrical current. This change in current is transmitted to an electronic control module, remote to the damper, which in turn generates a control signal, in response to the relative movement. The electrically controllable valve responds to this control signal to allow a regulated amount of hydraulic fluid to flow through the piston rod and between the chambers.

Detecting instantaneous relative movement between the piston assembly and piston rod can advantageously be converted into a signal which is indicative of the change in static pressure acting on the piston assembly, which signal can be converted into a control signal used to change flow between the chambers and effect rebound or compression of the vehicle.

Further, it is to be appreciated that the signal detected by the sensor, indicating the relative velocity between piston rod and piston assembly, can be directly converted into acceleration by electronic apparatus readily available in the control art.

Advantageously, acceleration determination will indicate the upper and lower chamber pressures and the damping force generated across the piston assembly. As such, the rebound or compression stroke of the piston rod can be controlled.

Advantageously, the immersion of the piston unit and sensor in the working fluid ensures adequate damping of its motion relative to the piston rod, so as to prevent acoustical ringing.

Other objects, advantages and features of the present invention will become apparent to one skilled in the art upon reading the following description and dependent claims, taken in conjunction with the following drawings.

DETAILED DESCRIPTION OF THE PREFERRED EMBODIMENT

Turning now to the drawings, FIGS. 1-4 illustrate an exemplary embodiment of an adjustable hydraulic damper according to the present invention, as adapted for providing a damping or cushioning effect between sprung and unsprung masses of an automobile vehicle, or between other interconnected but relatively movable components of other devices. The term "hydraulic damper" as used herein refers to hydraulic, direct, double acting telescopic dampers in the general sense of the phrase and includes "shock absorbers" as well as MacPherson struts. Although the present invention is depicted in the drawings as being adapted for an automotive application, one skilled in the art will readily recognize from the following discussion that the principles of the present invention are equally applicable to other types of suspension systems.

Figure 1:
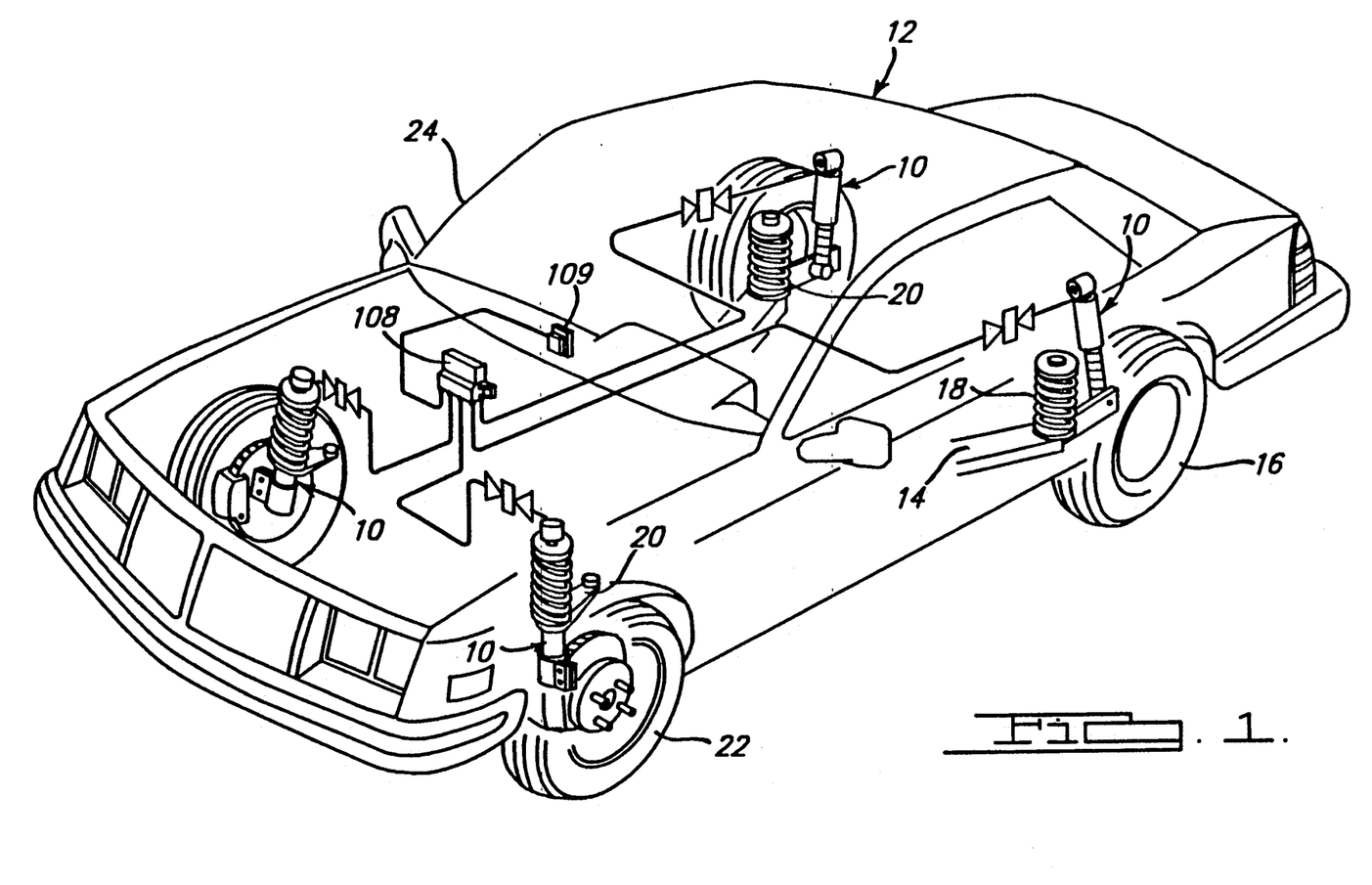
FIG. 1 is an illustration of an automobile including electronically-controlled piston-type hydraulic dampers according to the present invention.

Referring to FIG. 1, four hydraulic dampers 10 according to the preferred embodiment of the present invention are shown in operative association with a diagrammatic representation of a conventional automobile 12. The automobile 12 includes a rear suspension system 14 having a transversely extending rear axle assembly (not shown) adapted to operatively support the vehicle's rear wheels 16. The rear axle assembly is operatively connected to the automobile 12 by means of a pair of hydraulic dampers 10 as well as by the helical coil springs 18. Similarly, the automobile 12 has a front suspension system 20 including a transversely extending front axle assembly (not shown) to operatively support the vehicle's front wheels 22. The front axle assembly is operatively connected to the automobile 12 by means of a second pair of hydraulic dampers 10 and by the helical coil springs 18. The hydraulic dampers 10 serve to damp the relative movement of the unsprung portion (i.e., the front and rear suspension systems 20 and 14) and the sprung portion (shown as body 24) of automobile 12.

Figure 2:
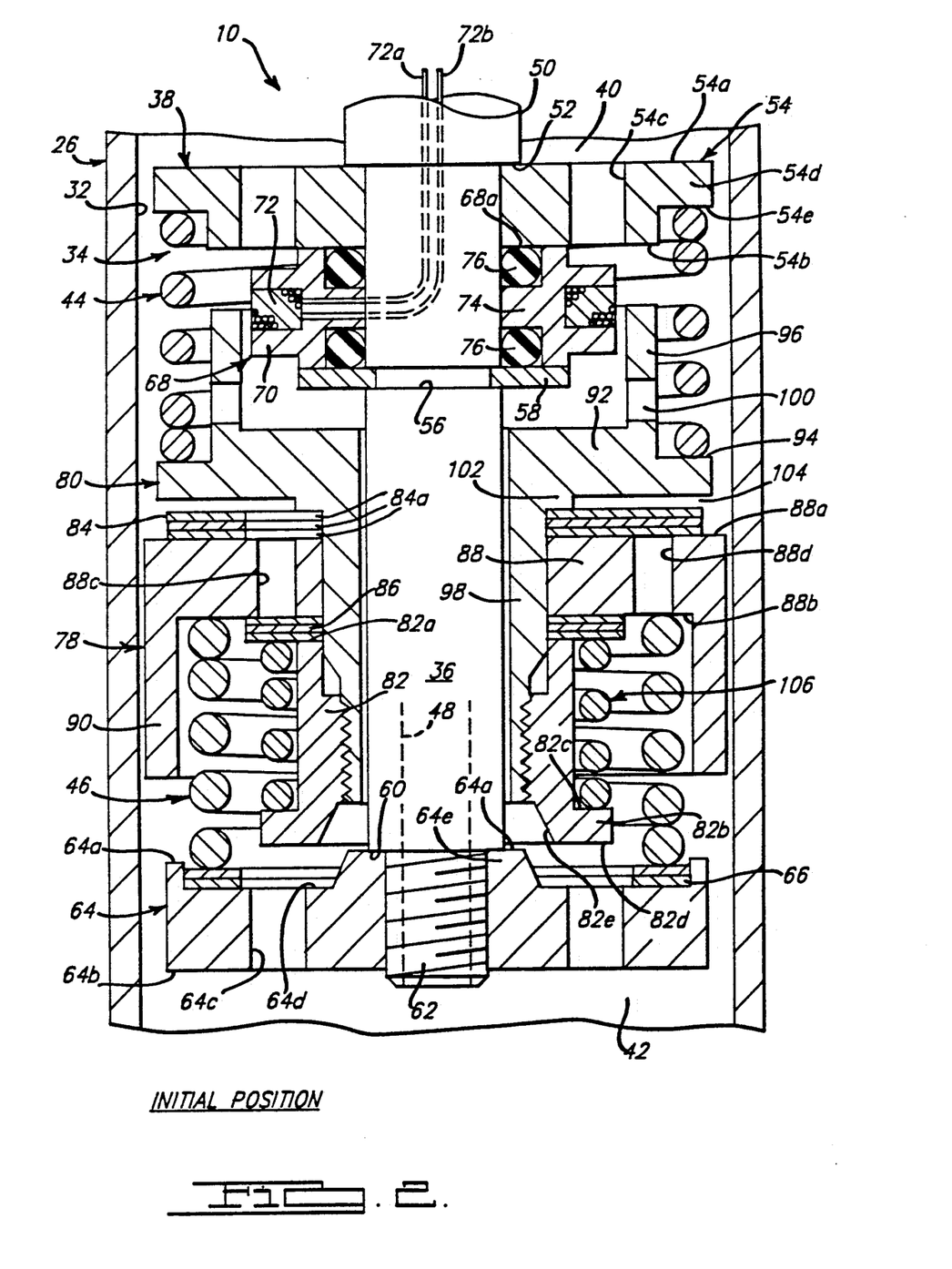
FIG. 2 is a partial longitudinal cross-sectional view of the hydraulic damper according to the present invention.

FIG. 2 shows damper 10 in its initial position. The damper 10 comprises a cylinder (or tube) 26 having an upper end 28, a lower end 30, and an inner wall 32, the cylinder having its opposite ends sealed whereby to define an interior chamber 34 for receiving a hydraulic fluid, the upper end of cylinder 26 being closed by a piston rod guide unit (not shown). An elongated axially displaceable piston rod 36 extends through the guide unit and into the cylinder interior, the piston rod being mounted for sealed reciprocation relative to the cylinder. A piston unit 38 is mounted on the inward end portion of the piston rod, the piston unit being reciprocably fitted to the piston rod and sealably positioned against inner wall 32 of cylinder 26 whereby to divide the cylinder interior into an upper rebound chamber 40 and a lower compression chamber 42. An upper and lower helical coil spring 44 and 46 connect piston unit 38 to piston rod 36 and resist axial reciprocating movement of the piston unit 38 relative to piston rod 36.

Piston rod 36 is provided with a central bore 48 to pass fluids between the chambers 40 and 42, has a generally cylindrical outer periphery 50, and is coaxially disposed in cylinder 26. As the piston unit 38 and piston rod 36 reciprocate axially, fluid moves relative to the central bore and passes between chambers 40 and 42 and through an electromagnetically controlled valve unit (not shown), depending on whether the damper is undergoing a rebound or a compression stroke. The valve unit associated with the piston rod includes a valve member which operates to restrictively allow damping fluid to flow between the chambers. The valve unit is electrically controlled and operable to be energized to move the valve member therewith between first and second positions whereby ports (i.e., orifices) are opened or closed, and a controlled amount of fluid may flow through the rod. Such a construction is described in the hereinabove incorporated Kato et al. patent.

Piston rod 36 includes an axial shoulder 52 for positioning a cylindrical locknut 54, an annular groove 56 for receiving a flat, cylindrical, snap ring 58, an axial shoulder 60 for positioning a cylindrical preload locknut 64, and an externally threaded end portion 62 for retaining locknut 64. Locknut 54 is disposed in upper rebound chamber 40 and includes a central bore sized to clearance fit about the outer periphery 50 of the piston rod, fluid passages 54c extending axially between the upper and lower axial faces 54a and 54b thereof, and an annular shoulder 54d having an axial face 54e adapted to engage one end of coil spring 44, the upper axial face 54a being adapted to abut against axial shoulder 52. Preload locknut 64 is disposed in lower compression chamber 42 and includes an internally threaded central bore adapted to threadedly engage the external thread 62, upper and lower axial faces 64a and 64b, and fluid passages 64c extending axially between axial faces thereof, the upper axial face 64a being adapted to abut against axial shoulder 60.

One or more thin, flat, centrally bored, washers 66 are stacked in a depression 64d provided in upper face 64a. Washers 66 are provided to engage one end of coil spring 46 and to adjust the axial spacing and preload in compression springs 44 and 46 relative to piston unit 38. In some applications, the washers may not be needed.

An annular sensor 68 is secured in a stationary manner to piston rod 36 by snap ring 58 whereby a top axial face 68a of the sensor is abutted against lower axial face 54a of locknut 54. The sensor comprises a cylindrical housing 70 having a central bore sized to clearance fit about the piston, an annular cavity opening radially outwardly and receiving an electrically conductive length of wire wrapped therearound and into a coil 72, and an annular shoulder 74 extending radially inwardly and encircling the piston rod. A pair of O-rings 76 are provided to seal the sensor 68 relative to the periphery 50 of piston rod 36 and shoulder 74 and thereby prevent pressure loss or fluid from passing between the chambers. The coil has wire ends 72a and 72b which extend through shoulder 74, through the center of piston rod 36 and to an external steady state alternating voltage source, such as an oscillator. Energization of electrical coil 72 by the external alternating voltage results in an alternating current whose magnitude is dependent on the resistance of the wires and the coil, and on the inductance of the coil. This current generates an alternating magnetic circuit "loop" proximate the piston unit 38. That is, the magnetic field forms a toroidal magnetic flux annulus which encircles the piston rod and has its axis generally aligned with the piston rod axis.

The piston unit 38 includes a ported piston 78, a piston seat 80, and a piston locknut 82. A plurality of compression valve disks 84 are stacked in sandwiched relation between piston 78 and piston seat 80 to control flow through the ported piston during compression. A plurality of rebound valve disks 86 are stacked in sandwiched relation between piston seat 80 and piston locknut 82 to control flow through the ported piston during rebound.

Ported piston 78 is generally cylindrical and comprises a radial body 88 having upper and lower axial faces 88a and 88b, and rebound and compression passages 88c and 88d, respectively, that extend axially between the faces thereof. The lower axial face 88a defines an abutment to engage both the other end of coil spring 46 and the rebound valve disks 84. The upper axial face 88a defines an abutment for seating and engaging the rebound valve disks 86. The axes defining axial passages 88c and 88d are generally parallel to the piston axis and concentric thereto. Rebound passage 86c and compression passage 88d are at different radii from the piston axis to cooperate, respectively, with the rebound and compression valve disks 86 and 84 whereby to pass fluid between the chambers.

A cylindrical sleeve 90 extends coaxially downwardly from body 88 into lower chamber 42 and protectively encircles a portion of coil spring 46. The outer periphery of sleeve 90 is dimensioned to be clearance fit relative to the inner wall 32 of tube 26 whereby to inhibit fluid leaking and pressure loss between the chambers.

Piston seat 80 is generally cylindrical and includes a radially extending body 92 having a central bore sized to clearance fit about the piston rod, an abutment having an axial face 94 to engage the other end of coil spring 44, and a pair of cylindrical sleeves 96 and 98, the sleeves being generally concentric with one another and to the piston rod axis and each extending generally coaxially from body 92.

Sleeve 96 encircles annular sensor 68 and is a "spoiler" sleeve adapted to interfere with the magnetic flux. One or more passages 100 extend radially through the sleeve 96 to pass fluid and enable reciprocation of the piston assembly.

Sleeve 98 is partially externally threaded to enable its being rigidly secured to piston locknut 82. A land 102 extends coaxially from body portion 92 to form an axial abutment surface to engage compression valve disks 84, provide an annular cavity 104 between opposed axially spaced faces of the body portions 88 and 92, and provide a space to control deflection of compression valve disks 84 during compression when fluid is forced through passages 88d.

Piston locknut 82 is generally cylindrical and includes a stepped, internally threaded, central bore which is adapted to engage the external threads on sleeve 98 of piston seat 80, an axial end face 82a adapted to engage rebound disks 86, and an annular shoulder 82b defining upper and lower axial faces 82c and 82d. The central bore tapers outwardly to form a frustoconical surface 82e which intersects end face 82d and is adapted to nest about a raised land 64e formed on preload locknut 64, or pass within the central bore of the adjustment washers 66, if provided.

A helical coil spring 106 encircles locknut 82 and has its opposite ends engaging, respectively, the rebound disks 86 and the axial end face 82c on the piston locknut 82. Coil spring 106 inhibits deflection of rebound valve disks 86 and cooperates to restrict the flow through the passages 88c during rebound of the piston assembly.

Helical springs 44 and 46 encircle the piston rod and bias piston unit 38 for reciprocating movement between locknuts 54 and 64 and relative to the piston rod reciprocation. The springs are preloaded and in compression to allow compliant axial movement of the piston unit relative to the piston rod in both directions. Spring 44 is disposed in upper rebound chamber 40 and has its opposite respective axial ends engaging abutment 54d of locknut 54 and abutment 94 of piston seat 80. Spring 46 is disposed in lower compression chamber 42 and has its opposite respective ends engaging 88b of piston 78 and, if provided, the washers 66 or axial face 64a of locknut 64. Coil spring 46 is protectively disposed in the cylindrical annulus formed about the piston rod by sleeve 90.

The compression valve disks 84 are centrally bored, stacked together, and sandwiched between land 102 extending axially from piston seat 80 and the upper face 88a of the piston 78. Each disk has several angularly separated openings, or lobes 84a, partially defining the central bore or inner diameter thereof, the lobes cooperating to expose orifices 88c (one is shown in the left-half of FIGS. 2-4) and the disks 84 closing orifices 88d (one is shown in the right half of FIG. 2).

Figure 3:
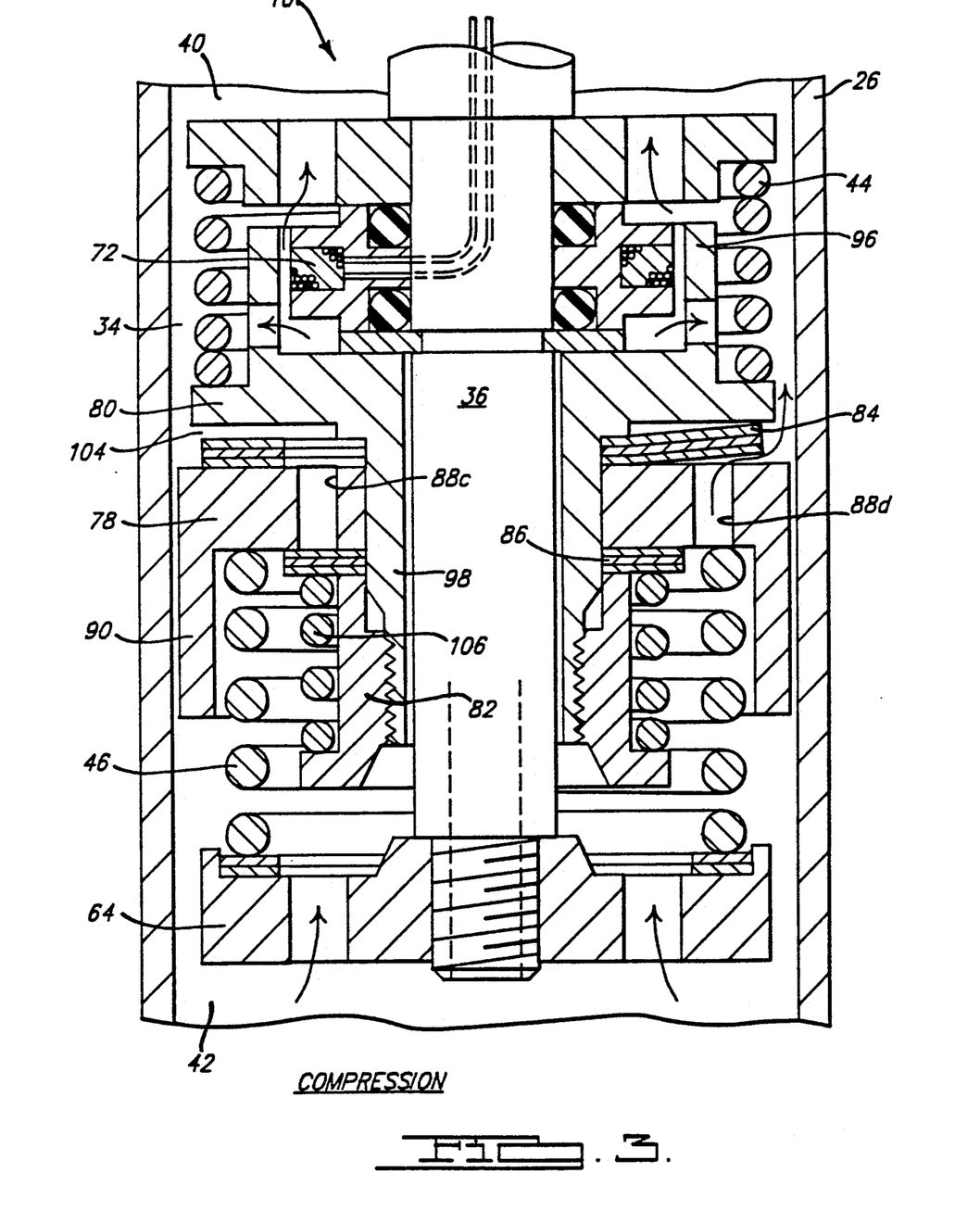
FIG. 3 is a cross-sectional view of the hydraulic damper showing fluid flow through the piston during compression.
Figure 4:
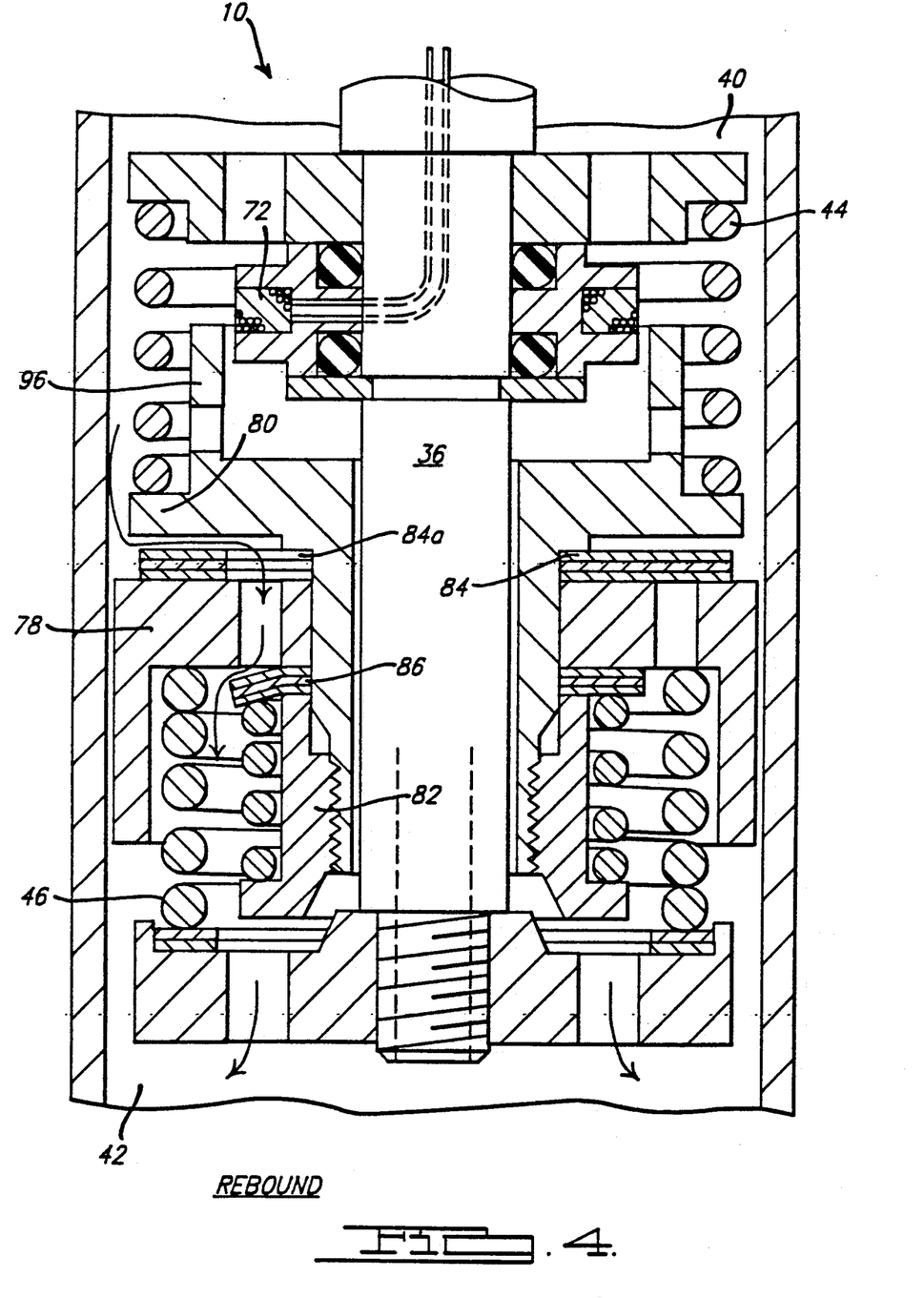
FIG. 4 is a cross-sectional view of the hydraulic damper showing fluid flow through the piston during rebound.

The rebound valve disks 86 are stacked together and captivated between the upper axial end face 82a of piston locknut 82 and end face 88b of the piston 78, the rebound valve disks being sized to cover axial passages 88c (one is shown to the left in FIG. 2) and expose the passages 88d (one is shown to the right in FIGS. 2-4).

An electronic control module 108 continuously receives the output from the electrical coil 72 and continuously generates an electronic control signal for controlling the electromagnetically controlled valve unit whereby to cause more or less fluid to flow between the chambers. By regulating this fluid flow, the damping characteristic of the damper is adjusted, and the relative movement between the body 26 and the suspension system is moderated in such a manner as to optimize both ride comfort and road-handling ability simultaneously. The logic means of the module 108 are conventional and form no part of this invention.

In one construction a suitable resulting spring stiffness was about $1.3 \times 10^6$ N/m (e.g., 6,500 lb/in). Desirably, the piston assembly would be of low mass in comparison to the stiffness of the springs in order that the natural frequency of the piston assembly be well above the "wheel-hop" frequency. In this regard, a typical piston assembly, having a mass of 0.2 kg (e.g., 7 oz.) would possess a natural frequency of 400 Hz, when using the above-specified springs.

In operation, damping fluid is allowed to flow between the chambers 40 and 42 by passing through the axial passages provided in piston unit 38 and piston rod 36. Referring to FIG. 3, when the piston rod 38 moves downwardly (i.e., in a direction inwardly of the cylinder), the piston unit 38 moves upwardly (i.e., in a direction outwardly of the cylinder) and the damper operates in the compression mode. Working fluid in the lower chamber 42 flows into upper chamber 44 by passing through the axial passages 88d in piston 78 thereby deflecting compression valve disks 84. Rebound disks 86 do not allow fluid to pass through passages 88c. Motion of spoiler sleeve 96 through the magnetic flux field generated by coil 72 induces a change in electrical current, which is reflected in the control module 108 changing the control signal sent therefrom to the electromagnetically controlled valve unit, whereby the valve passages of the controlled valve unit are adjusted to regulate fluid allowed to pass upwardly through the piston rod and effect a desirable damping force.

Referring to FIG. 4, when piston rod 36 moves upwardly (i.e., in a direction outwardly of the cylinder), the piston unit 38 moves inwardly and the damper operates in the rebound mode. Working fluid in the upper chamber 40 flows into the lower chamber by passing through the cavity 104, through lobes 84a of compression valve disks 84 and into axial passages 88c in the piston 78. When the pressure is high enough, the rebound disks 86 will overcome the bias of spring 106 and deflect to pass fluid. In like fashion, motion of spoiler sleeve 96 through the magnetic flux induces a current change and the control module 108 actuates the controlled valve unit whereby fluid is permitted to pass downwardly through the piston rod to effect a damping force. Fluid cannot readily flow through the piston unit because the coil spring 106 acting on the rebound valve disks provides resistance to plate deflection. Thus, the flow resistance produced as a damping force during extension is greater than that during compression.

Because the piston unit can undergo slight axial movement relative to the piston rod, one of the preloaded coil springs 44 and 46 will be more compressed and the other of the preload springs being less compressed, and vice versa. Small axial movement of the piston unit relative to the piston rod is proportional to the damping force across the piston. This relative movement of the piston unit is converted to proportional current change by inductive sensor 68. Depending on the operating pressures in the chambers, the flow of damping fluid is increased or decreased in the respective chambers by control module 108 adjusting the electromagnetically controlled valve unit. The electrical current signal is received by the valve unit whereupon the control member is adjusted. Depending on predetermined control logic, the characteristics of the damper is adjusted/varied to optimize ride, handling and/or road holding.

The sensing and damping control is based on self-inductance in the electrical coil immovably wound coaxially to the piston rod. The coil is driven by a steady-state alternating voltage, such as by oscillator 109, resulting in an alternating current whose magnitude is dependent on the resistance of the wires and the coil, and on the inductance of the coil. A toroidally-shaped alternating magnetic circuit is generated by the current, characterized by lines of magnetic flux looping around the coil-wire cross-section and at least partially crossing the cylindrical spoiler sleeve 96 extending from the piston seat. Motion of spoiler sleeve 96 modifies the permeability (i.e., magnetic resistance) of the magnetic path, as a function of its position relative to the coil. This will change the intensity of the magnetic circuit, and hence the level of the opposing voltage induced in the coil (i.e., the self-inductance of the coil). The change in the inductance of the coil will result in a change in its current, which is the signal being measured.

While the above description constitutes the preferred embodiment of the invention, it will be appreciated that the invention is susceptible to modification, variation, and change without departing from the proper scope or fair meaning of the accompanying claims.

What I claim is:

1. A hydraulic damper for damping the relative movement between the sprung and unsprung masses of an automobile comprising a pressure cylinder to store damping fluid, an axially displaceable piston rod extending in a sealed manner into the cylinder, a damping piston reciprocably fitted to said piston rod and dividing the cylinder into a first and second chamber, a spoiler member connected to said piston for reciprocable movement relative to said piston rod, bias means for resisting axial movement of said piston relative to said rod, valve means associated with said piston for restrictively allowing damping fluid to flow between said chambers when said piston rod reciprocates within said cylinder, alternating voltage generator means external to said cylinder for energizing an electrical coil coaxial to the rod and generating a magnetic field about said spoiler, current sensing means remote to said piston for detecting movement of said spoiler relative to said magnetic field and operable to generate an electrical current signal in response to said movement, and electrically controllable flow means for regulating flow of damping fluid between said upper and lower chambers in response to said electrical control signal.

2. The hydraulic damper as set forth in claim 1, wherein said bias means comprises a helical coil spring disposed about the piston rod and connected to the piston.

3. The hydraulic damper as set forth in claim 1, further comprising axially spaced first and second shoulders, at least one shoulder extending from said piston rod, and said bias means comprises a pair of resilient springs each having first and second ends, said first ends engaging said piston and said second ends engaging one respective shoulder.

4. The hydraulic damper as set forth in claim 1, wherein said bias means comprises first and second coil springs having opposite ends, respectively, engaging the piston rod and piston assembly whereby said piston is sandwiched between said springs.

5. The hydraulic damper as set forth in claim 4, wherein said coil springs are preloaded and in compression to enable bidirectional motion proportional to force.

6. The hydraulic damper as set forth in claim 4 wherein said unsprung mass has an undamped "wheel hop" frequency, and the mass of said piston relative to the combined spring constant of said coil springs being such that the natural frequency defined by the coil springs and piston mass is substantially above the "wheel hop" frequency of the unsprung mass.

7. The hydraulic damper as set forth in claim 4, including adjustment means for adjusting the compression in the first and second coil springs.

8. The hydraulic damper as set forth in claim 1, wherein said electrical coil is immovably secured about the piston rod for movement therewith, said coil being operatively connected to an oscillator remote to the cylinder for energizing the coil and generating the magnetic field about the spoiler.

9. The hydraulic damper as set forth in claim 8 wherein said spoiler comprises a generally cylindrical sleeve disposed for encircling relation about said electrical coil.

10. The hydraulic damper as set forth in claim 1 wherein said valve means comprises a first flow path between said chambers and said electrically controllable flow means when the piston rod moves during rebound, and a second flow path between said chambers and said electrically controllable flow means when the piston moves during compression, said flow paths for communicating fluid between the chambers and the fluid flow being in a direction opposite to that of said piston direction.

11. The hydraulic damper as set forth in claim 1 wherein said piston includes first and second axial passages adapted to pass fluid between the chambers, a compression valve plate adapted to expose and cover, respectively, the openings of said first and second axial passages, and a rebound valve plate adapted to cover and expose, respectively, the openings of said first and second axial passages, said compression and rebound valve plates cooperating to pass fluid through said first passage and prevent fluid from passing through said second passage when the piston rod is moving inwardly of the cylinder in a first direction and the piston is moving in a second and opposite direction, and to pass fluid through said second passage and prevent fluid from passing through said first passage when the piston rod is moving outwardly of the cylinder in said second direction and the piston is moving in said first direction opposite direction.

12. The hydraulic damper as set forth in claim 11 wherein said piston includes a plurality of said first and second passages, each arranged on respective axes concentrically disposed about the piston axis.

13. The hydraulic damper as set forth in claim 11 wherein said compression valve plate includes a central opening sized to encircle the piston rod with the opening having radial lobes adapted to register with said first passages normally closed by said rebound valve plate when the piston rod is moving inwardly.

14. The hydraulic damper as set forth in claim 11 wherein said piston includes second bias means acting against said rebound valve plate for inhibiting said rebound valve plate opening in response to outward movement of the piston rod.

15. The hydraulic damper as set forth in claim 11 including a plurality of one said rebound valve plate and compression valve plate.

16. The hydraulic damper as recited in claim 11 wherein said piston comprises first and second piston parts, and connecting means for connecting the piston parts together whereby respective axial faces of said parts are in axially spaced relation to define an annular chamber about said compression valve plate adapted to communicate fluid between said passages and said first and second chambers.

17. The hydraulic damper as recited in claim 16 wherein said spoiler comprises a generally cylindrical sleeve that extends from said first piston part and disposed in encircling relation to said electrical coil.

18. The hydraulic damper as recited in claim 16 wherein axially spaced first and second shoulders extend from said piston rod, said first piston part defines a first annular abutment, said second piston part defines a second annular abutment, and said bias means includes first and second coil springs being mounted, respectively, between the first annular abutment and first shoulder and the second shoulder and second annular abutment.

19. The hydraulic damper as recited in claim 18 wherein said connecting means includes a cylindrical locknut threadably connectable to said first piston part and adapted to sandwich the rebound valve plate against said second piston part.

20. The hydraulic damper as recited in claim 19 wherein said locknut includes an annular flange, and further including a third coil spring which encircles said locknut and has one and the other of its ends, respectively, engaging said flange and said rebound valve plate.

21. The hydraulic damper as recited in claim 20 wherein said second piston part includes a protective sleeve disposed in encircling relation about said locknut whereby to protectively enclose both said second and third coil springs.

22. The hydraulic damper as recited in claim 1 including adjustment means for adjusting the preload in said bias means.

23. The hydraulic damper as recited in claim 22 wherein said adjustment means includes a locknut threadably secured to said piston rod, and spacer plate means mounted on said locknut to increase the compression in said bias means.

24. The hydraulic damper as recited in claim 1 wherein said electrical coil is coiled within an outwardly opening annular groove of a cylindrical body removably mounted to the piston rod.

25. A remotely controlled infinitely variable apparatus for damping the movement of the body of an automobile, comprising: a ported damping piston and a cylinder, said cylinder forming a working chamber operable to store damping fluid and said piston being movable in said cylinder and dividing said chamber into a first and second portion, first flow varying means associated with said piston for allowing fluid to pass through the piston and between the portions, second flow varying means, coupled to the motion of said ported damping piston and including an electromagnetically operated bidirectional flow control valve, for varying the flow of working fluid permitted to flow in one direction and the flow of working fluid permitted to flow in the opposite direction, said bidirectional flow control valve being operable by an electrical control signal remote t said piston for allowing flow in either direction but not in both directions simultaneously and not through the piston, means including an electrical coil spaced from said piston and energizable by an electrical voltage for generating a magnetic field, a spoiler connected to said piston for reciprocable movement relative to said magnetic field whereby to induce a change in current in said coil, and control means for sensing said change in current in said coil and generating said electrical control signal whereby to vary and control the flow of working fluid through said second flow varying means.

26. The damping apparatus as recited in claim 25 wherein said piston is associated with an end portion of a piston rod extending inwardly of the cylinder, and further including means for mounting the piston to the piston rod such that movement of the piston rod is generally in a direction opposite to that of the piston.

27. An apparatus for damping the movement of the body of an automobile relative to a wheel of said automobile, said apparatus comprising a pressure cylinder defining a working chamber, a reciprocating piston rod and piston assembly disposed in the cylinder, said piston assembly operable to divide the working chamber into first and second chamber portions, said piston assembly being mounted to the piston rod for reciprocating movement thereto and generally in a direction opposite to said piston rod movement, first valve means, operably associated with the piston assembly, for selectively permitting and preventing, the flow of damping fluid between the chamber portions, respectively, during compression and rebound strokes of the piston rod, second valve means for selectively permitting the flow of additional damping fluid between the chamber portions during said compression and rebound strokes, and electromagnetic control means for the remote adjustment of said second valve means, in response to movement of said piston assembly, to instantaneously vary flow of additional working fluid between the chamber portions but in a path not through said first valve means.

28. The apparatus as recited in claim 27 wherein said second valve means comprise a bore extending through said piston rod for communicating fluid between said chamber portions, and an actuatable member, operated by said control means, for permitting or preventing additional fluid to pass through said bore.

29. In a hydraulic damper, a cylinder for damping fluid, a ported piston assembly dividing the cylinder into rebound and compression chambers and reciprocably mounted in said cylinder for restrictively passing fluid between the chambers as the piston assembly reciprocates, a piston rod associated with said piston assembly and movable inwardly and outwardly of said cylinder, connecting means for connecting the piston assembly to the piston rod whereby the piston assembly moves in a direction generally opposite to the direction of movement of said piston rod, adjustment valve means associated with said piston guide rod and piston assembly and selectively operable upon receipt of a control signal remote to said damper for providing and preventing additional fluid to pass therethrough and between said chambers, and electromagnetic control means for sensing the movement of said piston assembly and sending a control signal to said adjustment means to adjust the amount of additional flow between the chambers.

30. The invention as recited in claim 29 wherein said connecting means includes a pair of axially spaced shoulders at least one of which extends from said rod, and bias means, acting on said shoulders and piston assembly, for biasing the piston assembly for axial reciprocation relative to the rod.

31. The invention as recited in claim 29 wherein said control means includes an electrical coil fixed at a location about the piston rod, said coil being adapted to generate a magnetic field about said piston, and said control means operating to sense the change in inductance in the coil as the piston assembly moves relative to said location and generate a control signal to modify the flow through said adjustment valve means.

32. The invention as recited in claim 29 wherein said control means includes means for generating a magnetic field about the piston assembly, spoiler means extending from said piston assembly for moving relative to the magnetic field and inducing a current, and means for sensing the induced current.

33. The invention as recited in claim 32 wherein said spoiler means includes a cylindrical sleeve extending generally coaxially from said piston assembly and encircling said magnetic field generating means.

* * * * *

UNITED STATES PATENT AND TRADEMARK OFFICE
CERTIFICATE OF CORRECTION

PATENT NO. : 5,007,659
DATED : April 16, 1991
INVENTOR(S) : Yoram Guy

It is certified that error appears in the above-indentified patent and that said Letters Patent is hereby corrected as shown below:

On the Title page, item [57], Abstract: Line 15, after "electrica" insert --coil--;

Col. 9, Line 43, Claim 11, "direction" should be --and--;

Col. 10, Line 60, Claim 25, "t" should be --to--.

Signed and Sealed this

Twenty-first Day of December, 1993

Attest:

BRUCE LEHMAN

*Attesting Officer*  *Commissioner of Patents and Trademarks*